United States Patent
Kang

(10) Patent No.: US 8,392,914 B2
(45) Date of Patent: Mar. 5, 2013

(54) METHOD AND APPARATUS FOR RECOGNIZING PROCESSES IN GOS BY VMM

(75) Inventor: Hua Kang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1077 days.

(21) Appl. No.: 12/146,872

(22) Filed: Jun. 26, 2008

(65) Prior Publication Data

US 2009/0007109 A1  Jan. 1, 2009

(30) Foreign Application Priority Data

Jun. 29, 2007  (CN) .......................... 2007 1 0118186

(51) Int. Cl.
   *G06F 9/455*  (2006.01)
(52) U.S. Cl. ................. 718/1; 711/6; 711/202; 712/228
(58) Field of Classification Search .................. None
See application file for complete search history.

(56) References Cited

U.S. PATENT DOCUMENTS 6,598,144 B1 * 7/2003 Bailey et al. .................. 711/203
2008/0244155 A1 * 10/2008 Lee et al. ......................... 711/6

* cited by examiner

*Primary Examiner* — Emerson Puente
*Assistant Examiner* — Sisley Kim
(74) *Attorney, Agent, or Firm* — Dickstein Shapiro LLP

(57) ABSTRACT

The present invention provides a method apparatus for recognizing a process in a guest operation system by a virtual machine monitor, and the method comprises: step 101 of recording by the virtual machine monitor the page table information of a process to be executed upon process switching of the guest operating system; step 102 of acquiring by the virtual machine monitor the identification information of the currently-executed process; step 103 of storing by the virtual machine monitor the correspondence between the previously recorded page table information of the process to be executed and the identification information of the currently-executed process. By storing the correspondence between the process page directory base address and the identification information of the process, the method and apparatus of the present invention enable the virtual machine monitor to locate and monitor processes executed in the GOS, thus promoting the management granularity on GOS of the virtual machine monitor to a process level.

5 Claims, 1 Drawing Sheet

--- the VMM records the page directory base address of a process to be executed when GOS switches between processes — 101

↓ the VMM acquires the readable identification information of the currently-executed process — 102

↓ the VMM stores the correspondence between the previously recorded page directory base address of the process to be executed and the identification information of the currently-executed process — 103

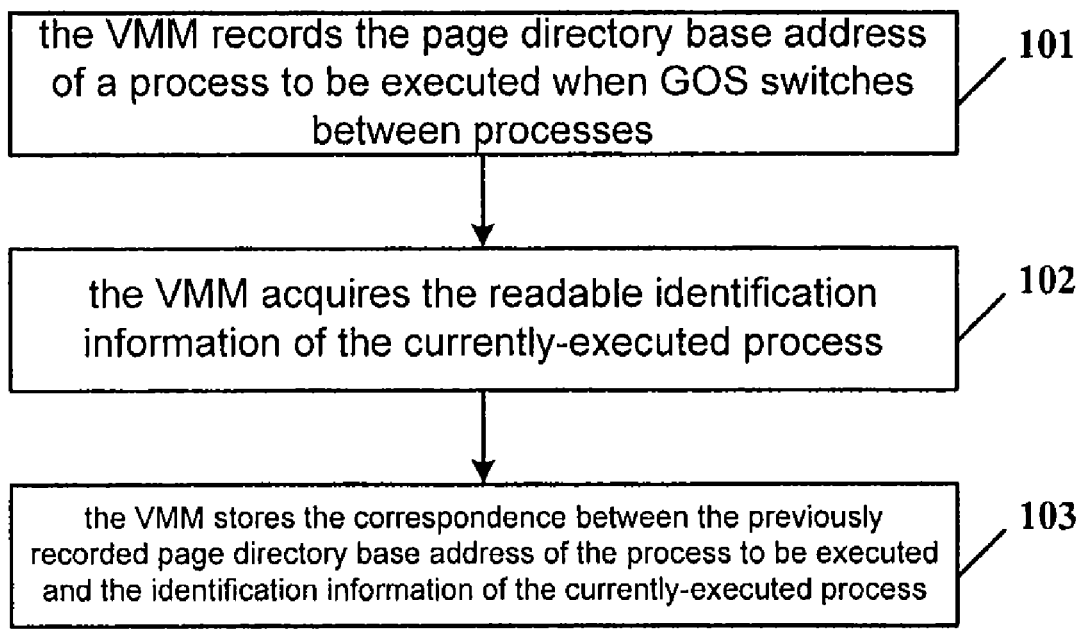

METHOD AND APPARATUS FOR RECOGNIZING PROCESSES IN GOS BY VMM

BACKGROUND OF THE INVENTION

1. Field of Invention

The present invention relates to the process monitoring technique, and particular to a method and apparatus for recognizing a running process in a GOS (Guest Operating System) by VMM (Virtual Machine Monitor).

2. Description of Prior Art

In a virtual context, only the overall running situation of a GOS can be viewed on a VMM, such as the resource occupation and running status of a GOS, however, it is difficult to recognize and locate any running process in a GOS.

On the other hand, it is of great importance to locate and monitor running processes in GOS, since the location of running processes in GOS is required in many cases, such as cases of monitoring the GOS system load, monitoring the usage of process resource in GOS system, detecting process deadlock and unlocking in GOS system, adding a patch to a given process in GOS and the like.

Therefore, it is necessary to develop a method and apparatus for recognizing a running process in a GOS so as to locate and monitor running processes in the GOS.

SUMMARY OF THE INVENTION

The object of the present invention is to provide a method and apparatus for recognizing a running process in a guest operation system by a virtual machine monitor so as to locate and monitor running processes in the GOS.

In order to achieve the above object, the present invention provides a method for recognizing a process in a guest operation system by a virtual machine monitor, which comprises:
step 101 of recording by the virtual machine monitor the page table information of a process to be executed upon process switching of the guest operating system;
step 102 of acquiring by the virtual machine monitor the identification information of the currently-executed process;
step 103 of storing by the virtual machine monitor the correspondence between the previously recorded page table information of the process to be executed and the identification information of the currently-executed process.

In the above method, said page table information is page directory base address.

In the above method, the step 101 further comprises:
step 1011 of performing process switching and accessing CR3 register by the guest operating system;
step 1012 of capturing by the virtual machine monitor the operation of accessing CR3 register by the guest operating system;
step 1013 of acquiring by the virtual machine monitor the page directory physical base address of the process to be executed.

In the above method, said identification information of the currently-executed process is a process-readable identification in the process descriptor of the currently-executed process or a unique identification allocated to the currently-executed process by the virtual machine monitor.

In the above method, when the said identification information of the currently-executed process is a process-readable identification of the currently-executed process, said process descriptor is acquired by the virtual machine monitor from underlying hardware or from the guest operation system via a specific interface.

In the above method, said step 101 further comprises a determination step of determining whether the acquired page directory base address has been saved, and entering the step 102 if the answer is NO.

In the above method, in said step 103 the correspondence between the previously recorded page table information of the process to be executed and the identification information of the currently-executed process is stored in a pair of key values.

To realize the above object, the present invention further provides an apparatus for recognizing a process in a guest operation system by a virtual machine monitor, which comprises:
a page directory base address recording module for recording the page table information of a process to be executed upon process switching of the guest operating system;
a process identification information acquisition module for acquiring the identification information of the currently-executed process;
a storage module for storing the correspondence between the previously recorded page table information of the process to be executed and the identification information of the currently-executed process.

In the above apparatus, said page table information is page directory base address.

In the above apparatus, said identification information of the currently-executed process is a process-readable identification in the process descriptor of the currently-executed process or a unique identification allocated to the currently-executed process by the virtual machine monitor.

By storing the correspondence between the process page directory base address and the identification information of the process, the method and apparatus of the present invention enable the virtual machine monitor to locate and monitor processes executed in the GOS, thus promoting the management granularity on GOS of the virtual machine monitor to a process level.

Based on the present invention, a number of advanced functions of virtual environment management can be implemented, such as some significant applications of VMM's control on GOS processes, resource allocation in unit of a process, deadlock detection, process transfer in a virtual environment, GOS system reinforcement, adding patches to a given process in GOS and the like.

BRIEF DESCRIPTION OF THE DRAWINGS

FIG. 1 is a schematic flowchart of an embodiment of a method according to the present invention.

DETAILED DESCRIPTION OF PREFERRED EMBODIMENTS

In the present invention, the page table information of a process to be executed and the identification information of the currently-executed process are first recorded by a VMM at the time of process switching, and then a process is recognized according to the page table information and the identification information.

Hereafter, the method and apparatus of the present invention will be particularly described by example of page directory base address. It should be noted that the present invention can also be realized by utilizing other information in the page table information.

Shown in FIG. 1 is a schematic flowchart of an embodiment of a method according to the present invention, which comprises:

at step 101, a VMM records the page directory base address of a process to be executed when GOS switches between processes;

at step 102, the VMM acquires the identification information of the currently-executed process;

at step 103, the VMM stores the corresponding relation between the previously recorded page table information of the process to be executed and the identification information of the currently-executed process.

Now, each of the above steps will be elaborated.

The process switching of the GOS at step 101 may occurs in a non-interruption context invocation of a kernel status, such as during a system call or a driver, or may appear in an interruption context invocation of a kernel status, such as at the timekeeping stage of a clock interruption.

Upon the process switching of the GOS at step 101, the page directory of a process to be executed will be loaded, and the loading of the page directory of a process to be executed requires the operations of acquiring the physical base address of the page directory from CR3 register and loading the corresponding page table.

Obviously, the access to CR3 register from GOS will be captured by VMM as soon as the access is made, and such capture triggers the switching of execution environment from the GOS to the VMM. At this moment, the VMM can acquire the physical base address of the page directory of the process to be executed.

At step 102, two cases are available to the identification information of the currently-executed process as:

1 the identification information of the currently-executed process is a process-readable identification of the currently-executed process;

2. the VMM assigns a unique identification to the currently-executed process.

The latter case is viable as long as the identification allocated to the currently-executed process is different from those allocated to other previously-executed processes, and the detailed explanation will be omitted here.

Apparently, monitoring of process can be conducted with higher efficiency according to process name by identifying the currently-executed process with a process-readable identification.

Next, the former case, i.e., the case in which the identification information of the process is a process-readable identification, will be illustrated particularly.

Take the operating system of Linux as an example, in Linux process management, the process descriptor of the currently-executed process can be parsed through the kernel or interruption stack pointer information, since the stack information and process information are arranged to be stored in continuous pages.

Therefore, the process descriptor of the currently-executed process can be acquired with the code:

movl $0xffffe0000,% ecx/* or 0xfffff000 for 4 KB stacks*/ and1% esp,% ecx movl(% ecx),p As for the operating system of Windows, the process descriptor of the currently-executed process can be parsed from prcb (processor control block). The address of prcb is fixed for each type of processor, and thus VMM can acquire the process descriptor of the currently-executed process readily in accordance with such address.

The process-readable identification of the currently-executed process can be obtained from the process descriptor of the currently-executed process immediately after it has been acquired.

Naturally, the VMM can also acquire the process descriptor in such a manner that a table of the process descriptor is exposed to the VMM by GOS via a specific interface, for example, informing the VMM of the process descriptor by way of a virtual device.

The above two approaches to acquire the process descriptor differ from each other in that the former requires no participation of GOS, while the latter needs to interact with GOS for process descriptor acquisition and thus requires a certain modification on GOS.

To avoid a repeated storage, step 101 can further comprises, after the VMM has acquired the page directory base address of the process to be executed, a determination step of determining whether the page directory base address of the process to be executed has been saved. If it has been stored, there is no need to continue the processing, since it indicates that the corresponding relation between the page directory base address and the identification information of the processes has been saved in the preceding processing, and the process to be executed has been recognized by VMM. Otherwise, if the answer to the above determination is negative, it is indicated that the process to be executed has not yet been recognized by VMM. Therefore, the processing proceeds to step 102 for further recognition.

At step 103, the VMM stores the previously recorded page directory base address of the process to be executed and the identification information of the currently-executed process in a corresponding manner, and the process executed in the guest operation system can be recognized and tracked on the basis of such stored correspondence information.

The page directory base address of the process to be executed and the identification information of the currently-executed process can be stored in a pair of key values.

It can be observed from step 103 what is stored correspondingly are actually the page directory base address of the process to be executed, which is recorded in the execution preceding to the current one, and the identification information of the currently-executed process. This is because the currently-executed process is just the process to be executed in the previous process switching, and storage of such corresponding relation can guarantee the correct relationship between the previously recorded page directory base address of the process to be executed and the identification information of the currently-executed process.

A practical example is given below. Assuming that the information on process A has been saved in the VMM as shown in the following table:

| Number | Physical base address of page directory | Process-readable identification |
|---|---|---|
| 1 | Address 1 | ABC | the currently-executed process is process B, and the process to be executed is process C.

Now, explanation is made on the above assumption.

It can be seen that the switching from process A to process B has occurred before the switching from process B to process C, and the following information can be obtained with the method of the present invention:

the VMM records the page directory base address of the process to be executed (process B) (here, the address is assumed as Address 2) when GOS switches from process A to process B;

VMM acquires the identification information of the currently-executed process (process A).

At the time of switching from process B to process C, the method of the present invention is applied in the following manner:
the VMM records the page directory base address of the process to be executed (process C) (here, the address is assumed as Address 3) when GOS switches from process B to process C;
the VMM acquires the identification information of the currently-executed process (process B) (here, the identification is assumed as BCD).

Thereafter, VMM will store the previously recorded page directory base address (Address 2) of the process to be executed (process B) and the identification information (BCD) of the currently-executed process (process B) in a corresponding manner.

As a result, the corresponding relation is updated and saved as:

| Number | Physical base address of page directory | Process-readable identification |
|--------|------------------------------------------|----------------------------------|
| 1      | Address 1                                | ABC                              |
| 2      | Address 2                                | BCD                              |

Similarly, the above processing can be applied to subsequent process C, process D, . . . , which can thus recognized by VMM using the method of the present invention.

Furthermore, the apparatus of the embodiment of the present invention comprises:
a page directory base address recording module for recording the page table information of a process to be executed upon process switching of GOS;
a process identification information acquisition module for acquiring the identification information of the currently-executed process;
a storage module for storing the corresponding relation between the previously recorded page table information of the process to be executed and the identification information of the currently-executed process.

The foregoing description gives only the preferred embodiment of the present invention. It should be understood that, to those ordinarily skilled in the art, various improvements and modifications can be made within the principle of the present invention and should be encompassed by the scope of the present invention.

What is claimed is:

1. A method for recognizing a process in a guest operation system by a virtual machine monitor, comprising:
    step 101 of recording by the virtual machine monitor a page table information of a process to be executed upon process switching of the guest operation system, wherein said step 101 further comprises:
    step 1011 of performing process switching and accessing CR3 register by the guest operation system;
    step 1012 of capturing by the virtual machine monitor the operation of accessing CR3 register by the guest operation system;
    step 1013 of acquiring by the virtual machine monitor a page directory physical base address of the process to be executed; and
    step 1014 of determining whether the acquired page directory physical base address has been saved, and entering step 102 if the answer is NO;
        step 102 of acquiring by the virtual machine monitor an identification information of a currently executed process; and
    step 103 of storing by the virtual machine monitor the corresponding relation between the page table information of the currently executed process, which has been recorded upon a previous process switching, and the identification information of the currently executed process, wherein in said step 103 the corresponding relation between the previously recorded page directory physical base address of the process to be executed and the identification information of the currently executed process is stored in a pair of key values;
    wherein said page table information is the page directory physical base address.

2. The method as claimed in claim 1, wherein said identification information of the currently executed process is:
    a process-readable identification in the process descriptor of the currently executed process; or
    a unique identification allocated to the currently executed process by the virtual machine monitor.

3. The method as claimed in claim 2, wherein when the said identification information of the currently executed process is a process-readable identification of the currently executed process, said process descriptor is acquired by the virtual machine monitor from underlying hardware or from the guest operation system via a specific interface.

4. An apparatus for recognizing a process in a guest operation system by a virtual machine monitor, comprising:
    a page directory physical base address recording unit configured to record a page table information of a process to be executed upon process switching of the guest operation system;
    wherein said guest operation system is configured to:
        perform process switching and access CR3 register; and
        capture by the virtual machine monitor the operation of accessing CR3 register;
    wherein the virtual machine monitor is configured to:
        acquire a page directory physical base address of the process to be executed; and
        determine whether the acquired page directory physical base address has been saved;
        a process identification information acquisition unit configured to acquire, if the acquired page directory physical base address has not been saved, an identification information of a currently executed process; and
        a storage unit configured to store the corresponding relation between the page table information of the currently executed process, which has been recorded upon a previous process switching, and the identification information of the currently executed process, wherein the corresponding relation between the previously recorded page directory physical base address of the process to be executed and the identification information of the currently executed process is stored in a pair of key values;
    wherein said page table information is the page directory physical base address.

5. The apparatus as claimed in claim 4, wherein said identification information of the currently executed process is:
    a process-readable identification in the process descriptor of the currently executed process; or
    a unique identification allocated to the currently executed process by the process identification information acquisition unit.

* * * * *